UNITED STATES PATENT OFFICE 2,295,587

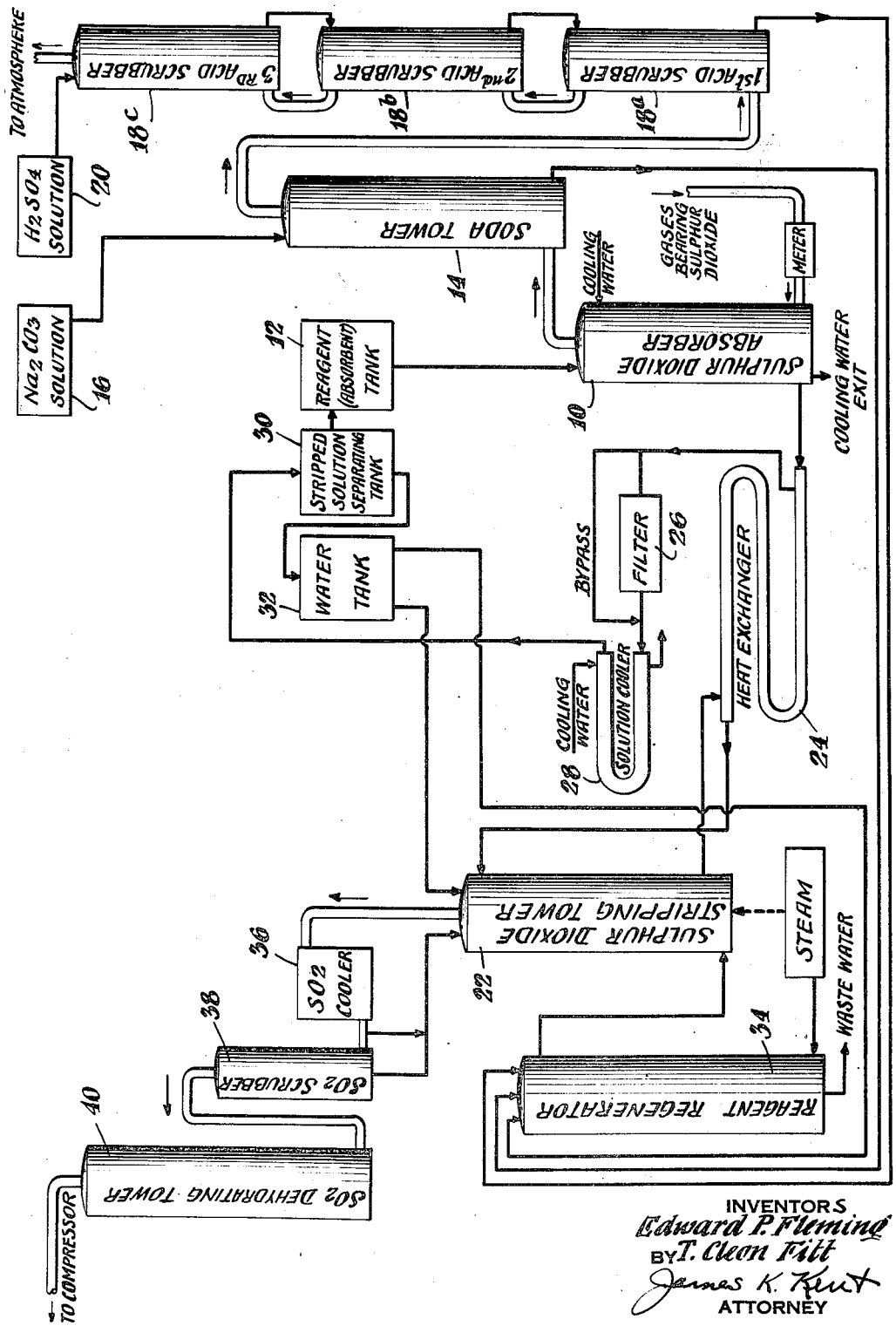

RECOVERY OF SULPHUR DIOXIDE FROM GAS MIXTURES

Edward P. Fleming and T. Cleon Fitt, Salt Lake City, Utah, assignors to American Smelting and Refining Company, New York, N. Y., a corporation of New Jersey Application November 25, 1939, Serial No. 306,052

7 Claims. (Cl. 23—178)

This invention relates to the production of sulphur dioxide.

It is well known to recover sulphur dioxide from smelter smoke, flue gases, and the like, by various absorption processes employing aromatic amines of the class comprising aniline and its homologues and derivatives, such as toluidine, xylidine, mesidine, methyl aniline, dimethyl aniline, ethyl aniline, diethyl aniline, etc., as the absorbent.

In any such process, one of the most important factors determinative of its commercial applicability is the economical recovery and regeneration of the absorbent reagent. Accordingly, one of the main objects of the invention is to provide a cyclic operation in which both reagent losses and regenerative costs are greatly reduced as compared to prior practises.

Among other features, the invention embraces new and novel features of operation and new and original arrangements and combinations of steps hereinafter fully described and more particularly set forth in the claims.

The drawing accompanying this specification and forming a part thereof is a flow sheet of the process of the invention and diagrammatically illustrates a plant for practising same.

Referring to the drawing, 10 is an absorbing tower and 12 is a reagent or absorbent tank. Reference character 14 denotes a soda tower and 16 a soda solution tank, while 18a, 18b and 18c represent a series of acid scrubbers, the last of which is connected with an acid solution tank 20. The sulphur dioxide stripping tower is shown at 22 and reference characters 24, 26 and 28 designate a heat exchanger, filter and solution cooler, respectively. Reference character 30 is a tank for separating the reagent and water components of the stripped absorbent and 32 is a tank for receiving said water component. The reagent regenerator is indicated at 34 and the coolers, scrubber and dehydrating tower for the sulphur dioxide recovered are identified by reference characters 36, 38 and 40, respectively. While various types of towers, scrubbers, etc. may be employed, experience has indicated a distinct preference for those of the bubble cap type. It will be understood, of course, that the system is provided with the necessary valves, pumps, meters, etc., not shown.

The invention may be practised as follows: the sulphur dioxide-bearing gases, after cleaning to remove non-gaseous contaminants, are passed into the bottom of the absorber 10 wherein they flow upwardly in countercurrent to the absorbent, preferably, dimethyl aniline, introduced into the top of the absorbing tower 10 from the absorbent reagent tank 12. Within the absorber, the sulphur dioxide is transferred from the gas mixture to the dimethyl aniline and the efficiency of the transfer is enhanced by controlled cooling of the absorber with water or other cooling fluid which removes the heat of reaction accompanying the absorption or transfer of the sulphur dioxide.

The gases are impoverished in sulphur dioxide and enriched in dimethyl aniline as they pass through the absorber and are conducted therefrom into the bottom of soda tower 14 in which they flow upwardly in countercurrent to sodium carbonate solution introduced into the top of tower 14 from tank 16.

Several objectives are attained by passing the gases through the soda tower, chief among which are: the dimethyl aniline (or other reagent) entrained as spray or mist is removed; the soda solution is preferably introduced at a lower temperature than the gases thereby decreasing the partial pressure of dimethyl aniline and consequently decreasing the amount thereof in the gases, some sulphur dioxide is absorbed from the gases; and the carbonate is converted to the sulphite (normal or acid or both) for regeneration of the absorbent as will be explained later.

From the tower 14, the gases (including the carbon dioxide from the carbonate reaction) pass into the bottom of the first of the three acid scrubbers, namely, 18a. Dilute acid solution is fed from tank 20 to the top of the third (18c) of these scrubbers which are arranged in series as illustrated in the drawing. In the scrubbers, any dimethyl aniline is converted to the sulphate and thus removed from the tail gases which exit to the atmosphere from the scrubber 18c.

The absorbent reagent, pregnant with sulphur dioxide, is withdrawn from the absorber 10 and sent to the stripping tower 22, passing en route through heat exchanger 24 countercurrently to the hot stripped reagent absorbent from said stripping tower. The stripped reagent is conducted from the heat exchanger 24 through filter 26 (or by-passed if filtering is unnecessary) and then further cooled by passage through stripped solution cooler 28 from whence it is delivered to the tank 30 in which the reagent is separated from the water, the former being sent to tank 12 for return to absorber 10 and the latter being sent to tank 32. The water in tank 32 contains some reagent and is divided into two portions, one of which is returned to the stripper 22, and the other of which is sent to the reagent regenerating tower 34 which also receives the sulphite solution from soda tower 14 and the acid solution from the acid scrubbers 18a, 18b, and 18c.

Steam is introduced into the regenerator 34 for the two-fold purpose of recovering the absorbent reagent by distillation and supplying heat to the stripping tower 22 for releasing the sulphur dioxide. If necessary, auxiliary or secondary steam may be supplied to the stripper as indicated in the drawing. By suitably adjusting the amount of sodium carbonate solution added to tower 14 with respect to the sulphate radical supplied to the system (mainly by dilute acid introduced into the scrubbers from supply tank 20 and to a very minor extent generated by oxidation within the system), it is possible to distill off as vapor from the regenerator 34, substantially all of the reagent thereby leaving for discard, a waste water free from reagent and containing the sulphate radical in solution.

Following its release from the absorbent in tower 22, the sulphur dioxide gas which contains some reagent and water vapors, is delivered to suitable coolers 36 and scrubber 38 wherein water is condensed out and reagent vapors converted to the sulphite (by reaction with sulphurous acid), both being returned to the stripping tower. The sulphur dioxide gas then goes to the dehydrator 40 and thence to a compressor to yield pure, liquid sulphur dioxide.

Those skilled in the art will readily appreciate the economies afforded by the invention through incorporation of the reagent recovery and regeneration operations as integral parts of the absorbent-desorbent process thereby making it possible to operate the latter as a truly complete cyclic system.

What is claimed is:

1. The process of recovering sulphur dioxide from gas mixtures which comprises intimately contacting such a gas mixture with an aromatic amine reagent to absorb the sulphur dioxide, impoverishing the sulphur dioxide-depleted gases with respect to reagent by passing them sequentially through solutions of soda and sulphuric acid, combining the reagent-enriched solutions, introducing steam therein in excess of that necessary to distill off the reagent, passing the excess steam and reagent vapors into the reagent pregnant with sulphur dioxide to release the latter, separating the resulting stripped solution into components comprising mainly water and reagent, and returning the latter to absorb further quantities of sulphur dioxide.

2. The process according to claim 1 in which at least a portion of the separated water component from the stripped solution is returned for steam treatment with the soda and acid solutions for recovery of reagent therefrom.

3. The cyclic process for treating sulphur dioxide-bearing gases which comprises flowing same in countercurrent to an aromatic amine reagent thereby transferring the sulphur dioxide to the latter, passing the sulphur dioxide-depleted gases through solutions of sodium carbonate and of dilute sulphuric acid thereby freeing the gases of reagent, passing the reagent pregnant with sulphur dioxide in heat exchange relationship to warm stripped reagent in known manner, treating the solutions through which the sulphur dioxide-depleted gases have passed with steam in excess, the acid solution proper at least being treated and maintained out of contact with the main body of absorbent, passing the excess steam and reagent vapors into intimate contact with the reagent pregnant with sulphur dioxide to expel the latter and yield warm stripped reagent, further cooling the stripped reagent emerging from the heat exchange with the pregnant reagent, separating anhydrous reagent from the water component of the stripped reagent, and returning said anhydrous reagent for treating additional volumes of sulphur dioxide-bearing gases.

4. Process according to claim 3 in which the water component of the stripped reagent is divided into two portions, the first of which is combined with the solution from the dilute sulphuric acid treatments of the sulphur dioxide-depleted gases and the second of which is added to the pregnant reagent undergoing desorption.

5. In a process for recovering sulphur dioxide by absorbing the sulphur dioxide from a mixture of gases with an aromatic amine reagent and then heating the reagent to release the sulphur dioxide, the improvement comprising sequentially treating the gases from the absorption step with sodium carbonate solution and dilute sulphuric acid to remove absorption reagent therefrom, combining the resulting solutions containing the reagent, treating same with steam to release the reagent, and using the released reagent to absorb additional sulphur dioxide.

6. The process for producing liquid sulphur dioxide from gas mixtures which comprises: absorbing the sulphur dioxide with anhydrous dimethyl aniline, recovering dimethyl aniline from the sulphur dioxide-depleted gases by sequential treatment with soda and sulphuric acid solutions, combining the solutions and heating same to yield a steam-dimethyl aniline mixture, adding said mixture to the dimethyl aniline pregnant with sulphur dioxide to release the latter and yield stripped dimethyl aniline solution, recovering anhydrous dimethyl aniline from said stripped solution and absorbing more sulphur dioxide therewith, cooling and scrubbing the sulphur dioxide released by stripping the pregnant solution and returning the condensate to the latter in known manner, and dehydrating and compressing the cold sulphur dioxide gas to produce pure liquid sulphur dioxide.

7. In a cyclic process for producing concentrated sulphur dioxide by absorbing the sulphur dioxide from a gas mixture with anhydrous dimethyl aniline and thereafter expelling the sulphur dioxide therefrom, the improvement which comprises sequentially scrubbing the effluent gases from the absorbing step with soda solution and sulphuric acid solution, heating the acid and soda solutions from said scrubbing steps and the dimethyl aniline pregnant with sulphur dioxide from the absorbing step to regenerate any sulphate dimethyl aniline and to strip both the pregnant and regenerated dimethyl aniline of sulphur dioxide, said regenerating and stripping operations being conducted without any substantial intermixture of the non-volatilized aqueous phase of the acid solution with the stripped dimethyl aniline, separating the water phase with its dissolved constituents from the stripped dimethyl aniline returning the dimethyl aniline in anhydrous state to the absorbing step and returning at least a very substantial part of the separated water phase to the acid solution for heating therewith.

EDWARD P. FLEMING.
T. CLEON FITT.